US006222186B1

(12) United States Patent
Li et al.

(10) Patent No.: US 6,222,186 B1
(45) Date of Patent: Apr. 24, 2001

(54) POWER-MODULATED INDUCTIVELY COUPLED PLASMA SPECTROMETRY

(75) Inventors: Gangqiang Li, Palo Alto; Thomas P. Doherty, San Mateo; Carl A. Myerholtz, Cupertino, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/104,754

(22) Filed: Jun. 25, 1998

(51) Int. Cl.[7] .............................. H01J 49/00; B01D 59/44
(52) U.S. Cl. .............................. 250/288
(58) Field of Search .............................. 250/287, 288; 315/111.01, 111.81, 111.21, 111.31, 111.41

(56) References Cited

U.S. PATENT DOCUMENTS

| | | | | |
|---|---|---|---|---|
| 3,958,883 | | 5/1976 | Turner | 356/85 |
| 4,760,253 | | 7/1988 | Hutton | 250/288 |
| 4,818,916 | | 4/1989 | Morrisroe | 315/111.21 |
| 4,906,582 | | 3/1990 | Fukui et al. | 436/153 |
| 5,155,547 | * | 10/1992 | Casper et al. | 356/316 |
| 5,394,411 | * | 2/1995 | Milchberg et al. | 372/5 |
| 5,526,110 | * | 6/1996 | Braymen | 350/316 |
| 5,654,543 | * | 8/1997 | Li | 250/287 |
| 5,869,829 | * | 2/1999 | Dresch | 250/287 |
| 5,939,718 | * | 8/1999 | Yamada et al. | 250/288 |
| 5,962,851 | * | 10/1999 | Whitehouse et al. | 250/288 |

FOREIGN PATENT DOCUMENTS

| | | | |
|---|---|---|---|
| 2-064438 | 3/1990 | (JP) | G01N/21/73 |

OTHER PUBLICATIONS

Nohora P. Vela, Lisa K. Olson and Joseph A. Caruso, "Elemental Speciation with Plasma Mass Spectrometry"; Analytical Chemistry, vol. 65, No. 13, Jul. 1, 1993, pp. 585A–597A.

R. S. Houk, "Mass Spectrometry of Inductively Coupled Plasma", Analytical Chemistry, vol. 58, No. 1, Jan., 1986, pp. 97A–105A.

John W. Olesik and Kathryn R. Bradley, "Analyte Excitation in the Inductively Coupled Plasma Studied by Power Modulation", Spectrochimica Acta, vol. 42B, No. 1/2, 1987, pp. 377–392.

(List continued on next page.)

*Primary Examiner*—Edward P. Westin
*Assistant Examiner*—John Patti

(57) ABSTRACT

A technique that modulates the power of a inductively coupled plasma (ICP) according to the operative modes of a spectrometer. An analytical apparatus of the present invention contains an inductively coupled plasma generator (ICPG) and a spectrometer. The ICPG generates a plasma for forming ionic and excited molecular species from a sample. The spectrometer analyzes the ionic and excited molecular species formed. The spectrometer operates in an analysis mode wherein the ionic and excited molecular species are identified according to physical characteristics of the species to provide data on the species and further has a washout mode wherein the spectrometer flushes out interfering ions and molecules and provides no significant data on the sample. The controller modulates the ICPG to operate in power cycles, at each cycle the ICPG operates in an analysis period and a stand-by period. By modulating the plasma power, the power consumption and heat dissipation can be reduced. When such a power modulated plasma source is coupled to, for example, a time-of-flight mass spectrometer (TOFMS), high analytical performance can be achieved with simultaneous multi-element detection capability.

23 Claims, 6 Drawing Sheets

OTHER PUBLICATIONS

A. F. Parisi, G. D. Rayson and G. M. Hieftje, "Temporally and Spatially Resolved Studies in an Amplitude Modulated Inductively Coupled Plasma", Spectrochimica Acta., vol. 42B, Nos. 1/2, 1987, pp. 361–376.

gary M. Hieftje, and Lori A. Norman, "Plasma Source Mass Spectrometry", International Journal of Mass Spectrometry and Ion Processes, 118/119 (1992) pp. 519–573.

Houk et al.,"Inductively Coupled Argon Plasma as an Ion Source for Mass Spectrometric Determination of Trace Elements", 1980, vol. 52(14), PP. 2283–2289, Anal. Chem.

Hewlett–Packard Chem. Analysis Products (Supplies Catalog), "HP4500plus Inductively Coupled Plasma and Mass Sepctometer", 1998, (11 pgs.).

"Induction–Coupled Plasma Spectrometric Excitation Source", 1965, vol. 37(7), pp. 920–922, Anal. Chem.

* cited by examiner

POWER-MODULATED INDUCTIVELY COUPLED PLASMA SPECTROMETRY

FIELD OF THE INVENTION

The present invention is related to apparatuses and techniques for ionizing or exciting samples to analyze the samples spectrometrically, and more particularly to apparatuses and methods for ionizing or exciting the samples with inductively coupled plasma and analyzing the ions and exited atoms with mass spectrometers.

BACKGROUND

The inductively coupled plasma (ICP) has been a powerful tool for analytical chemistry since it was introduced as an atomic emission source for optical spectrometry in the 1960's. In the ICP, radio frequency electrical energy is continuously coupled via a spiral load coil into an inert gas flow stream at atmospheric pressure. In a typical design, argon flows through a plasma torch made of three concentric quartz tubes (see, e.g., U.S. Pat. No. 3,958,883 (Turner)). The central gas flow, usually referred to the carrier gas flow because it is used to carry the sample to be ionized or excited, is usually 1 to 1.5 liters/minute, depending upon the characteristics of the sample. An intermediate gas flow of about 1 liter/minute, termed the auxiliary flow, is needed for confining the hot carrier gas and cooling. The outermost flow, termed the coolant gas, both sustains the plasma and protects the glass from melting from the high temperature. The coolant flow is generally 15 liters/minute with typical plasma torch designs.

The electromagnetic field induced by the radio frequency energy, which is typically at 27 MHZ or 40 MHZ, sustains a plasma in the gas. The plasma contains free electrons, ions, and excited atoms and molecules. A chemical sample, usually in a form of aerosol droplets, is introduced into the carrier gas steam through the central quartz tube into the plasma. The aerosol sample is vaporized and decomposed to atoms and small molecules, due to the high temperature of the plasma. Some of the atoms and molecules of the sample are further excited and ionized by the free electrons.

The ICP is a source suitable for coupling with an optical emission spectrometer (OES) since it produces a large number of excited and ionized atoms and molecules from a sample introduced into it (see, e.g., Wendt, R. H. and Fassel, V. A., *Anal. Chem.*, 1965, 37, 920–922). In an optical spectrometer, the emitted light is usually sent to a wavelength dispersive grating and detected by a photodetector array. The output of the detector array is then electronically integrated for a certain time period. The ICP has also been coupled with a mass spectrometer (MS) (see, e.g., Houk R. S. et al., "Mass spectrometry of inductively coupled plasmas," *Anal. Chem.*, 1980, 52, 2283–2289; and U.S. Pat. No. 4,760,253 (Hutton)). For mass spectroscopic detection, quadrupole mass filters are often employed. The chemical composition of the sample is determined by scanning the quadrupole filter within the mass range of interest. The description of the apparatuses and operation of ICP and spectrometers in Wendt, R. H. and Fassel, V. A., Houk R. S. et al., U.S. Pat. No. 3,958,883, U.S. Pat. No. 4,760,253, supra, and U.S. Pat. No. 4,818,916 (Morrisroe), infra, are incorporated by reference herein.

One of the major drawbacks of using the ICP for chemical analysis is the high cost of instrument manufacture and operation. To obtain useful radiation or to generate ions for routine chemical analysis, the ICP source is usually operated at high power, in the range of 800 to 1600 Watts, depending upon the sample introduced, which results in a very high temperature within to the plasma. Generation of such a high-energy radio frequency waveform normally requires a specially designed electronic circuit with high power output, such as the one described in U.S. Pat. No. 4,818,916 (Morrisroe). When the ICP source or the spectrometer (SP) in an ICP-SP system is not functioning normally, repair is often difficult and expensive. What is needed is an ICP-SP analytical apparatus with low energy consumption and that costs less to manufacture, operate and maintain.

SUMMARY

In the present invention, through modulating the operation of the ICP in an ICP-SP apparatus, in which an ICP is coupled to a spectrometer, a technique of reducing the power consumption of ICP spectrometers is provided, thereby reducing the need for cooling, as well as reducing the heat damage to the apparatus.

In one aspect of the present invention, an analytical apparatus contains an inductively coupled plasma generator (ICPG) and a spectrometer. The ICPG generates a plasma for forming ionic and excited molecular species from a sample introduced into the plasma. The spectrometer associated with the ICPG analyzes the ionic and excited molecular species formed in the ICPG. The spectrometer has an analysis mode wherein the ionic and excited molecular species are identified according to physical characteristics, e.g., mass-to-charge ratios or optical emission characteristics, to provide data on the species and further has a washout mode wherein the spectrometer flushes out interfering ions and molecules and provides no significant data on the sample. The controller modulates the ICPG to operate in power cycles, at each cycle the ICPG operates in an analysis period and a stand-by period. In the analysis period the ICPG operates at one or more analysis power levels to generate plasma to form the ionic and excited molecular species from the sample to correspond to the analysis mode of the spectrometer. In the stand-by period the ICPG stands by at one or more stand-by power levels lower than the one or more analysis power levels to correspond to the washout mode of the spectrometer.

This technique reduces the power consumption, hence the cost for both manufacturing and maintaining an inductively coupled plasma associated with a spectrometer. To reduce the power consumption of an inductively coupled plasma spectrometer, the full plasma power (the power needed to generate useful radiation or ion abundance for chemical analysis) is provided only when a sample is being introduced into the ICP and the spectrometer is recording a signal that reflects the characteristics of the sample. Such a decrease in the power dissipation would reduce or eliminate the need for water cooling, and would also reduce the need for forced-air cooling. A less complex and therefore less expensive radio frequency amplifier with a lower average output power can be used to provide power to this modulated plasma. Additionally, the flow rate of cooling gas through the plasma torch can be reduced when the plasma is at low power.

BRIEF DESCRIPTION OF THE DRAWINGS

The following figures are included to better illustrate the embodiments of the apparatus and technique of the present invention. In these figures, like numerals represent like features in several views.

DETAILED DESCRIPTION OF THE INVENTION

In the present invention, modulation of the inductively coupled plasma (ICP) power to correspond to the time during which ions or excited atoms formed from samples are analyzed by a spectrometer downstream from the ICP allows the ICP to operate with less power during stand-by periods when samples are not being analyzed. In the following, ICP coupled to a mass spectrometer (MS) is described as an illustration, however, it is to be understood that a person skilled in the art will be able to couple the ICP with other spectrometers capable of analyzing physical characteristics of ions, excited atoms and molecules, e.g., optical emission spectrometer (OES) and adapt the present invention to control the power of the ICP equally well.

Figure 1:
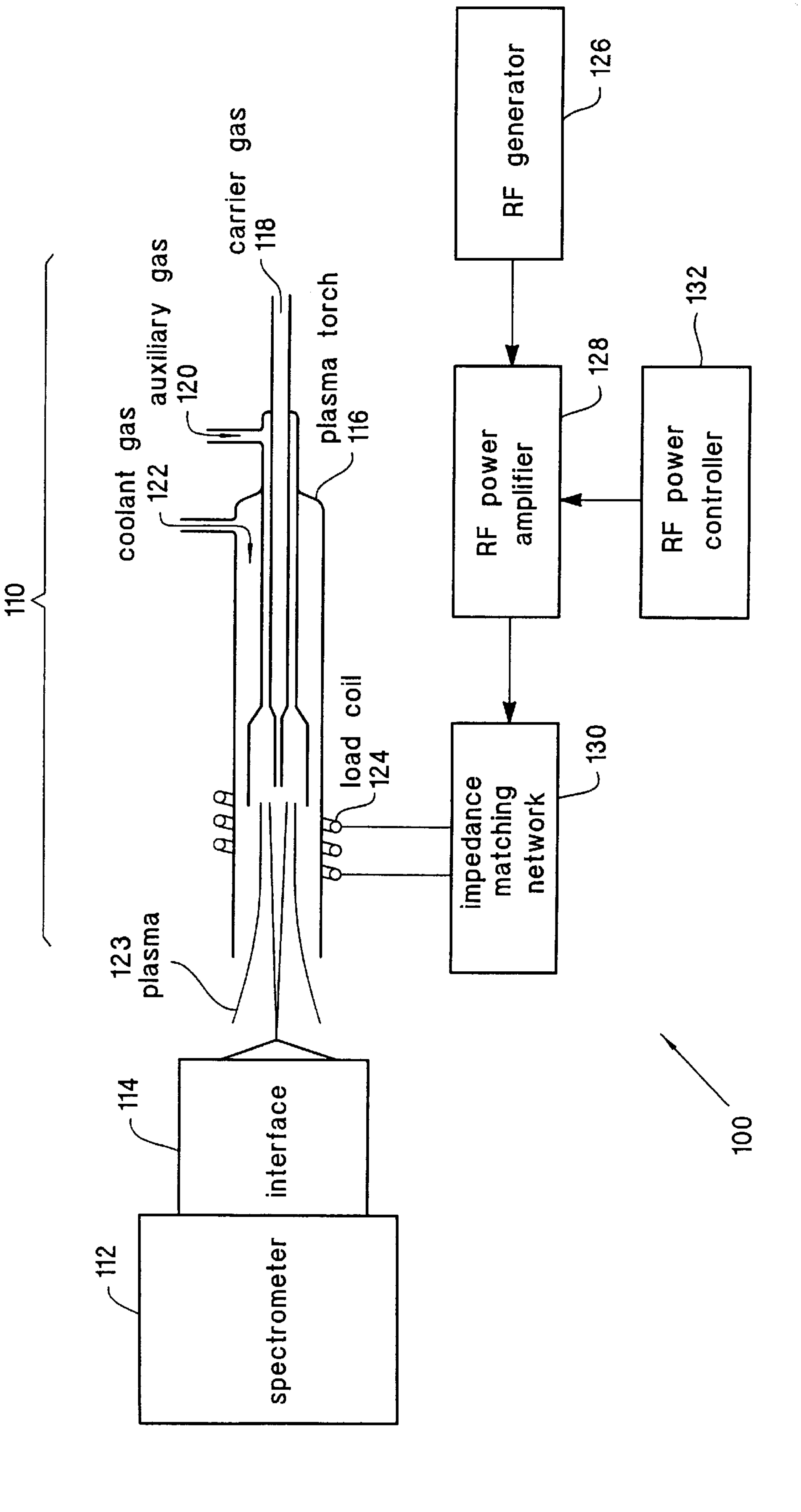
FIG. 1 shows an embodiment of the system of the present invention.

FIG. 1 shows a schematic representation (with some block diagrams) of an embodiment of an analytical inductively coupled plasma-spectrometer (ICP-SP) apparatus for plasma power modulation coupled with the operation of a spectrometer. In the ICP-SP 100 of FIG. 1, an inductively coupled plasma generator (ICPG) 110 is coupled to a spectrometer 112 (e.g., mass spectrometer, optical spectrometer, and the like) via an interface 114. An example of a commercially ICP-MS is the HP4500PLUS inductively coupled plasma mass spectrometer (Hewlett Packard Co., Palo Alto, Calif., USA), which is a quadrupole mass spectrometer. Another example of a quadrupole MS is the ELAN6000 ICP-MS available from Perkin-Elmer Corporation, Norwalk, Conn., USA). In this embodiment of ICPG 110, a plasma torch 116 (for example, a common "Scott Fassel" type about 18 mm in diameter and 100 mm in length, made of quartz) is used to heat the sample being introduced through the plasma torch 116 with a carrier gas 118. An auxiliary gas flow 120, typically an inert gas such as argon, confines the carrier gas 118 with the sample. An outermost coolant gas 122 flow, also typically an inert gas such as argon, protects the glass from being melted by the hot plasma 123.

The end of the plasma torch 116 that is proximate to the interface 114 is encircled by a load coil 124, which produces an oscillating magnetic field that sustains the plasma in the plasma torch 116. In this embodiment, the load coil 124 can be a common type with 2 to 4 turns of copper tube cooled by flowing water. The front end of the load coil 124 typically is grounded to reduce the plasma potential, although other grounding schemes can also be implemented by one skilled in the art. A radio frequency (RF) generator 126 generates a signal, which is amplified by a RF amplifier 128 that supplies the oscillating signal that powers the load coil 124. The load coil 124 can be connected to an impedance matching network 130 to ensure the load coil 124 and the plasma torch 122 present a proper load to an RF power amplifier 128. An RF power controller 132 controls the RF power amplifier to modulate the operation of the ICPG 110 such that ICPG operates in different powers levels corresponding to periods of analysis of sample and washout periods (which will be described below). The RF power controller 132 controls the power output by the ICPG 110. Such an RF controller can contain a processor (not shown in FIG. 1) such as an electronic digital computer, microprocessor, and the like, that can control the RF power amplifier. The processor can control the power output by the ICPG 110 by program codes that controls the steps of the process.

With a common solid state RF generator 126, the impedance matching network 130 usually consists of a variable shunt capacitor, and a variable serial capacitor under servomechanical control. However, the impedance matching network 130 is not needed when a free-running RF generator is employed. In an ICP-SP with a free-running RF generator, the frequency is controlled by the oscillating circuit of the RF generator and the plasma-load coil impedance. An example of a suitable RF power amplifier is one that can amplify, e.g., 27 MHZ to 40 MHZ, RF to a typical maximum power of 2000 Watts. The RF generator 126 can be a solid state or any resonant circuit that can generate the range of RF suitable for inductively coupled plasma generation. See, e.g., "Inductively Coupled Plasmas in Analytical Atomic Spectrometry" 2nd edition, edited by Akbar Montaser and D. W. Golightly VCH Publishers, New York, 1992.

The RF power controller 132 controls the plasma power modulation. In a simple iris case, it can be just a function generator such as a HP 8112A finction generator (Hewlett-Packard Co., Palo Alto, Calif.). As an example, in the HP4500PLUS inductively coupled plasma spectrometer, the power output is a linear function of the input of a 0 V to 5 V input results in an output of 0 W to 2000 W. In a more sophisticated case, the RF power controller 132 can be a computer controlled function generator that can produced a wide variety of waveforms as desired. Devices such as computers, microprocessors, RF generators, power amplifiers, are know in the art and a skilled person in designing control instrumentation for ICP will be able to implement control of the ICP based on the present disclosure.

Modulation of ICP Power

In one aspect of the present invention, the inductively coupled plasma (ICP) is modulated such that the ICP operates at a lower power when a sample is not being ionized or excited for a downstream spectrometric analysis. For example, for an inductively coupled plasma mass spectrometer (ICPMS) using a quadrupole or other scanning mass filter, a sample measurement takes about 5 minutes to collect meaningful data, assuming that 30 elements are measured and that each element is measured for 10 seconds. Longer or shorter data collection time can be used, depending on factors such as the number of samples being run. Between samples there is a period of time, referred to as the "washout time," when the signal from a detector in the apparatus, e.g., ICP-SP 100, is not significant for inference on the nature of a sample. The washout time is the time period when sample-conduction lines and sample-preparation devices, such as those needed for desolvating the sample, are being flushed between samples. Such washouts are done, for example, to safeguard the spectrometer, e.g., MS, from generating unreliable signals due to samples cross-mixing or due to contaminants such as water. Such washout time typically last for a period of about 50 to 100 seconds, although a different washout time can be used. Therefore, in the example of the above quadrupole ICP-MS, between 67 and 83% of the time, according to the present invention, the ICPG must be operated at a plasma power level deemed suitable for ionizing or exciting the sample for the downstream MS analysis. However, during the remaining 17 to 33% of the time, the plasma power can be reduced to the minimum required to sustain the plasma, or it can be turned off.

As previously stated, in conventional ICP-SP apparatuses, cooling is needed to prevent the plasma torch and the interface from overheating. Furthermore, other parts of the ICP-SP apparatus need cooling as well. For example, the radio frequency amplifier is 25 normally cooled by water (e.g., with a flow rate of 1 liter/minute for an ICP of about 1500 Watts). As shown in FIG. 1, since the load coil 124 is in close proximity with the plasma torch (torch 116), it too should be cooled, typically with a water flow of 0.2 liters/minute, to protect it from oxidation and corrosion damage. When the ICP source is coupled to a mass spectrometer such as one shown in FIG. 1, the plasma is brought very close to the interface 114 between the ICPG 110 and the spectrometer 112. Therefore, the interface 114 should be cooled, typically with a water flow of more than 1 liter/minute for a power level of about 1500 Watts. (At many laboratory locations, a chiller and water pump supply the cooling water in a closed loop in order to conserve water.) In addition, there are also many parts of the radio frequency power generation system that are cooled by forced-air fans. The need for all these cooling apparatuses contributes to the high manufacturing cost of the ICP-SP apparatuses, as well as the difficulty in maintaining the ICP-SP apparatuses in good working condition. The continuous high power consumption, the power required for cooling, and the continuous high flow of pure gas streams, e.g., argon, contribute to the complexity and cost of operating and maintaining conventional ICP-SP apparatuses. The cooling devices described above can also be used for the ICP-SP apparatuses of the present invention. However, by modulation of the ICP power in accordance with the present invention, the power consumption, and therefore the risk of heat damage, as well as cooling need, is reduced relative to conventional systems.

This modulation of the plasma power is particularly effective with simultaneous multichannel optical spectrometers and mass spectrometers, such as the time-of-flight mass spectrometer (TOFMS.) With the TOFMS, for example, the sample measurement can be done in about 10 seconds or less, but the washout time remains the same. Thus, in many cases, high plasma power is required for less than 20% of the time to ionize samples for downstream TOFMS analysis.

Preferably, the ICPG is modulated to operate in at least two modes: an analysis mode about (i.e., around and during) the time a sample is excited by adequate power to produce ions or excited atoms and molecules for downstream spectrometric analysis (e.g., MS, particularly TOFMS); and a stand-by mode in which the ICPG stands by, or rests at a lower power, about the washout time. Although the plasma can be turned off during the stand-by time, it is preferred that it be not turned off for an extensive period. If the plasma has been turned off for too long, it may be difficult to restart reliably on demand. Preferably, the ICPG is maintained such that it can be readily turned to full power for analysis of a sample. For example, in the stand-by period, the ICPG can be maintained at a power level (e.g., 400 Watts) higher than zero power but substantially lower than that needed to give meaningful signal to the sample, such as at less than half of the maximum power level used for ionizing the sample (e.g., 1600 Watts).

A further way to reduce power consumption is to control the ICPG during the stand-by period to go through a cycle of power levels, which includes a power level of about zero. For example, the ICPG can stand-by as it alternates (or cycles) between zero power and a power level (e.g., 400 Watts) higher than zero but substantially less than the maximum analysis power level (e.g., 1600 Watts). As a result, the ICPG does not stay in the zero power mode for a period long enough for the plasma to cool off extensively, thereby allowing the plasma to return to full power readily when needed. (See, for example, FIG. 5). Because of the tendency of the plasma to cool off quickly (less than a millisecond), it is preferred that this alternating swing of stand-by power level be an oscillation (as provided by, e.g., a computer, microprocessor, or an electronic oscillator) of sinusoidal, square, saw-tooth waves, and the like. The RF power controller 132 can be used to control the oscillation.

To operate the inductively coupled plasma-spectrometer (ICP-SP) efficiently, it is preferred that the apparatus be operated in analysis-stand-by cycles each including an analysis period and a stand-by period. Depending on the application, the stand-by period can be significant relative to the analysis time to save energy and reduce the cooling need or heat damage to the apparatus. In most cases where ICP is coupled to a spectrometer, the ICPG can be modulated such that the stand-by period is at least about 15% of an analysis-stand-by cycle. In many cases, such as when the spectrometer is TOFMS, the ICPG can be modulated such that the stand-by period is between about 15% and 90% of an analysis-stand-by cycle. It is to be understood that such exemplary ranges are given for illustration and are not to be interpreted as being limiting. Of course, if desired, the ICP can be turned to high power even when a sample is not being analysis by the ICP or the SP, as long as during part of the time during washout of the apparatus, the ICP is turned to a lower power. The ICP may be maintained at a higher power for cleaning, for example, as well as for other reasons.

When the ICP is operated at a medium (or intermediate) power, for example 800 Watts, often called the "cool plasma," one finds an increase in the number of molecular or polyatomic species: fragment species from incompletely dissociated molecules; oxides; argides; and species produced by molecule and atom recombination. The range of this medium power level is about 600 Watts to about 1000 Watts. This medium range can be compared with the stand-by period in which the power is typically no higher than about 600 Watts. Traditionally, such molecular species formed in the cool plasma often interfere with the measurement of atomic species, especially in ICP mass spectrometry. Some molecular species are more abundant at low plasma power, others at high power. However, according to the present invention, an advantage of the modulated plasma is that signals can be collected at several plasma powers, and the differences among the signals used to infer the concentrations of both the atomic species and the interfering molecular species. Knowledge of the concentrations of the molecular species is useful in providing information about origin of the sample. Such knowledge is important, e.g., for environmental chemistry, eco- and clinical toxicology, and the food and energy industries. Thus, during the analysis period of the ICP, a sample can be ionized or excited under two or more sequential analysis power levels for downstream analysis by the spectrometer.

Preferably, the controller that controls the ICP power can be set to automatically cycle between the various power levels in the analysis period and the stand-by period. It is understood that although for convenience sake the duration of a particular power level among detection cycles (which includes analysis period and a stand-by period) and the number of steps in each detection cycle remain the same, one can vary such durations and number of steps, especially the duration of analysis power levels.

Figure 2:
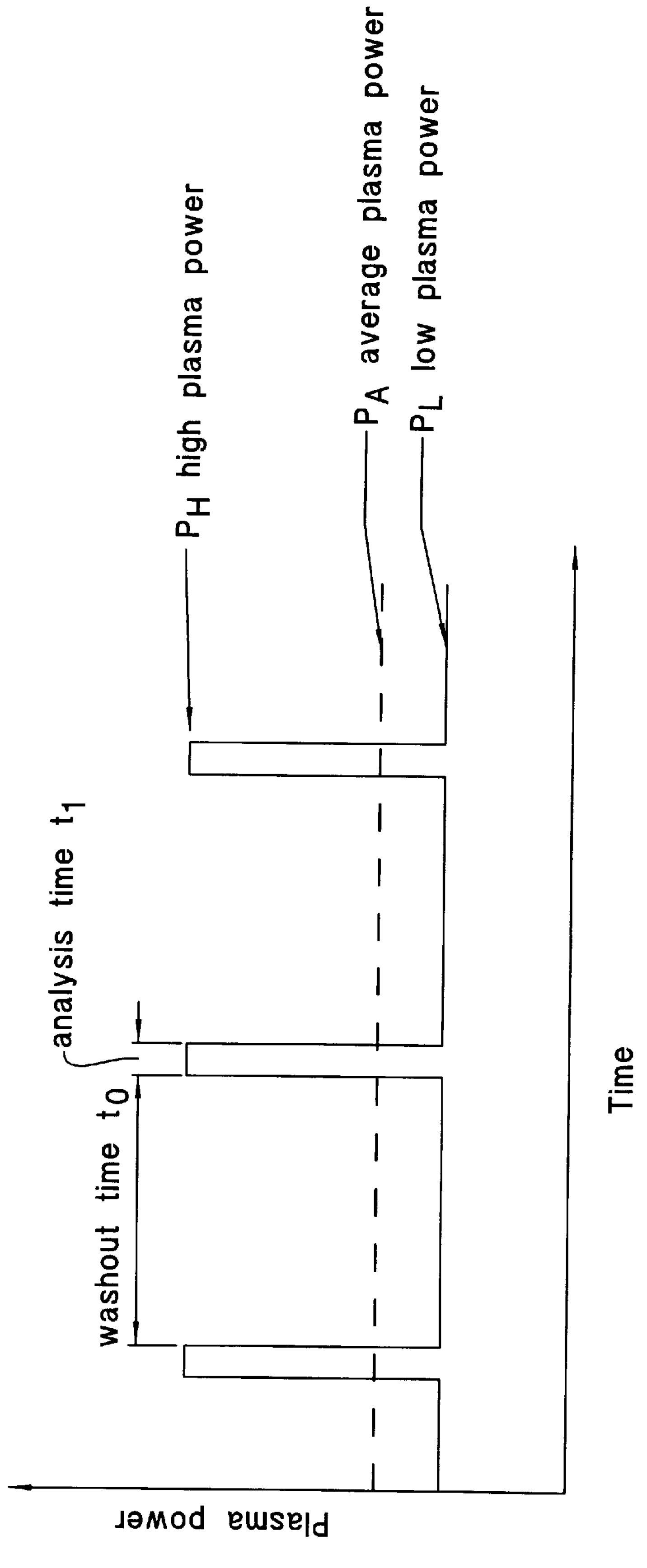
FIG. 2 shows an embodiment of a modulation waveform for the inductively coupled plasma (ICP) according to the present invention.

For illustration purposes, FIG. 2 to FIG. 5 show examples of how the power level of ICP can be modulated for an ICP-SP apparatus. FIG. 2 shows one embodiment of a modulation waveform (Mode #1). A sample is introduced into the ICP to be ionized or excited for analysis. During the analysis time periods ($t_1$), the plasma is turned to high power, which is usually about 1000 to 1500 Watts, and can sometimes be at 1600 Watts or even greater. The ions resulting from the sample ionizing in the ICP are passed into a spectrometer, e.g., a TOFMS for analysis. In the washout (i.e., stand by) time period ($t_0$) of the ICP-SP, no generation of the analysis signal (i.e., meaningful signal corresponding to the analysis of a sample) is necessary so the plasma power can be reduced as low as possible. In this invention, it has been shown that an inductively coupled plasma can be sustained for a long time period even when the power fed to the load coil is turned down to a low maintenance power level of about 200 Watts to 400 Watts. If desired, the maintenance low power level can be as high as about 600 Watts. In a typical measurement cycle, for instance, the plasma power is turned to high plasma power ($P_H$) at 1300 Watts for 1 second and then to low plasma power ($P_L$) at 400 Watts for 50 seconds. This operation sequence is called "pulsed plasma" herein. By using such a pulsed plasma technique, the average power consumption ($P_A$) in such a measurement cycle is approximately 418 Watts. During the stand-by period when the ICP is "powered down," the coolant gas flow can be reduced accordingly, for instance to 8 to 10 liters/minute. The plasma gas is therefore also "pulsed."

Figure 3:
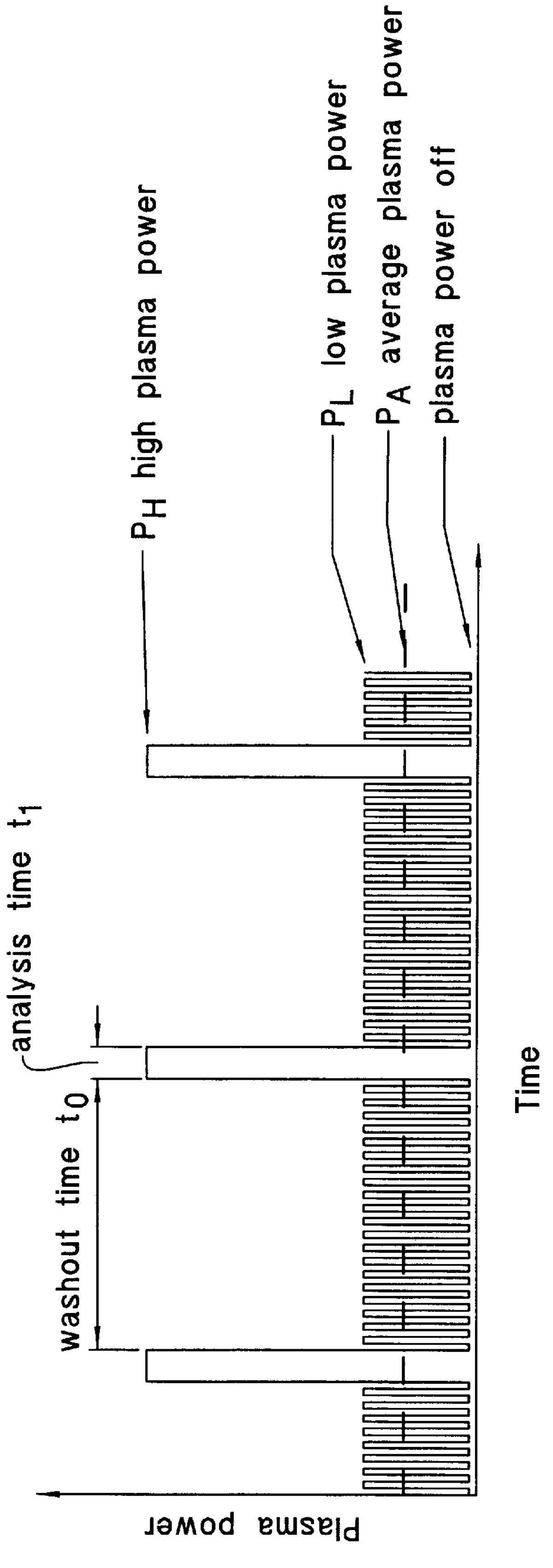
FIG. 3 shows another embodiment of a modulation waveform in which the plasma power is turned to a very low value or completely off for a short time period.

FIG. 3 shows another embodiment of a modulation waveform (Mode #2). It has been shown that the plasma power can be turned off completely for a short time period without extinguishing the plasma, e.g., a "turn off" time of 200 microseconds. Therefore, during the low power period, plasma power can be turned off for 200 microseconds before the power is turned up to a higher level again. In other words, the low power plasma can additionally be modulated, e.g., with a 50 kHz square waveform. Of course, a shorter turn off time can be used. Using the analysis time $t_1$ of 1 second (at 1300 Watts) and washout time $t_0$ of 50 seconds (at 400 Watts) as in Mode #1, the average plasma power $P_A$ consumption can be further reduced to approximately 222 Watts. Similar to Mode #1, the plasma cooling gas can be modulated in this mode.

Figure 4:
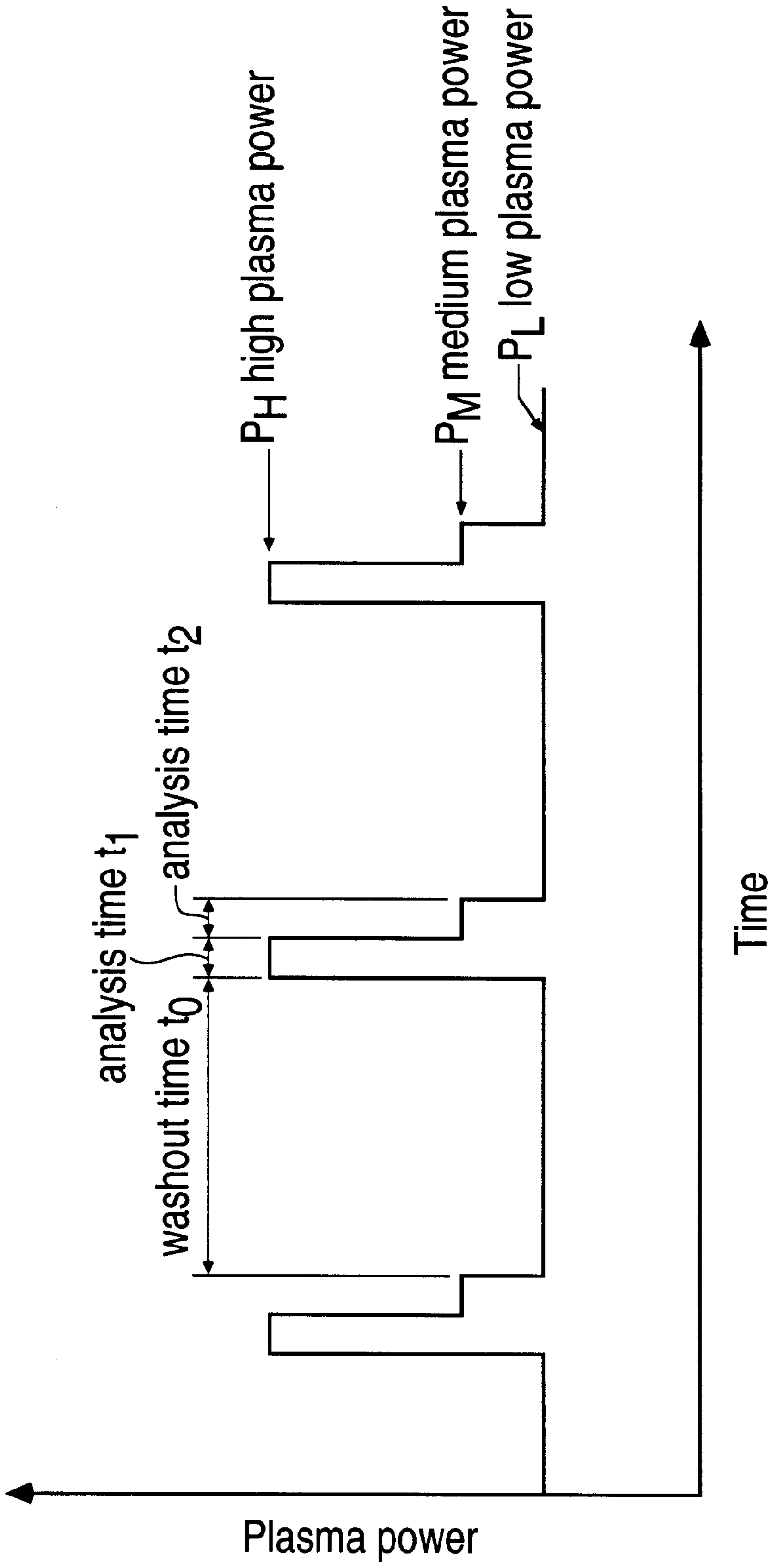
FIG. 4 shows an embodiment of a modulation waveform for providing information on the concentrations of atomic and molecular species at different analysis power levels.

FIG. 4 shows an example (Mode #3) of providing information on the concentrations of atomic and molecular species at different analysis power levels. This mode is intended not only to reduce the average plasma power, but also to obtain the sample composition with different plasma conditions. Unlike the embodiment of FIG. 2 (Mode #1) in which a simple square waveform is used, a more complicated waveform is employed. For instance, a stage of medium plasma power ($P_M$) is added. By operating the plasma in the medium power of about 600 Watts to 1000 Watts (cool plasma, analysis time period $t_2$), information about molecular species can be obtained. Medium plasma power ($P_M$) can be applied either before or after high plasma power. It is contemplated that more than two analysis power levels can be used to provide information on atomic and molecular species in the sample.

Figure 5:
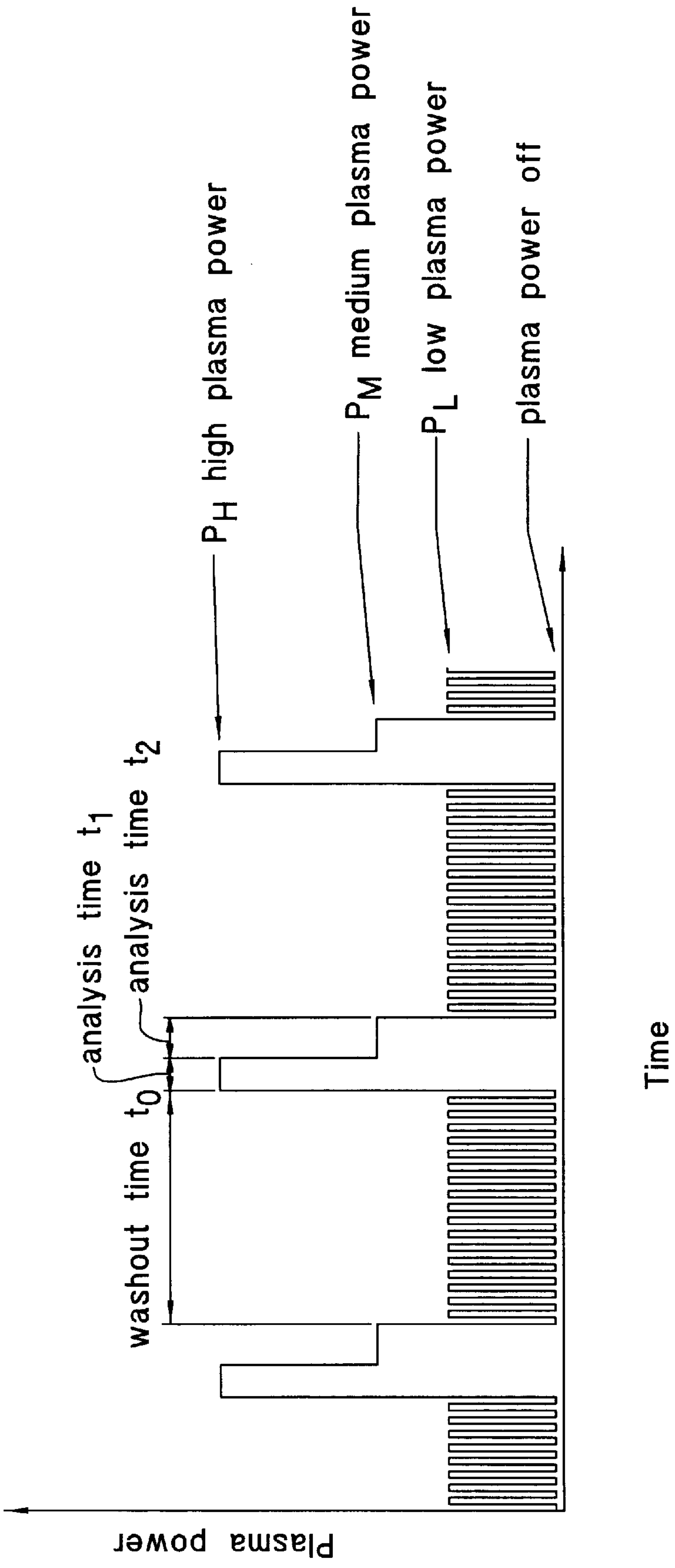
FIG. 5 shows an embodiment with step power changes in the analysis power level and with additional power modulation between a low plasma power level and an even lower or zero power during the stand-by period.

FIG. 5 shows an embodiment (Mode #4) with step power changes in the analysis power level and with additional power modulation between a low plasma power level and zero power during the stand-by period. In a detection cycle, there can be as many steps of plasma power change as required to obtain the desired atomic and molecular concentration information as well.

Figure 6:
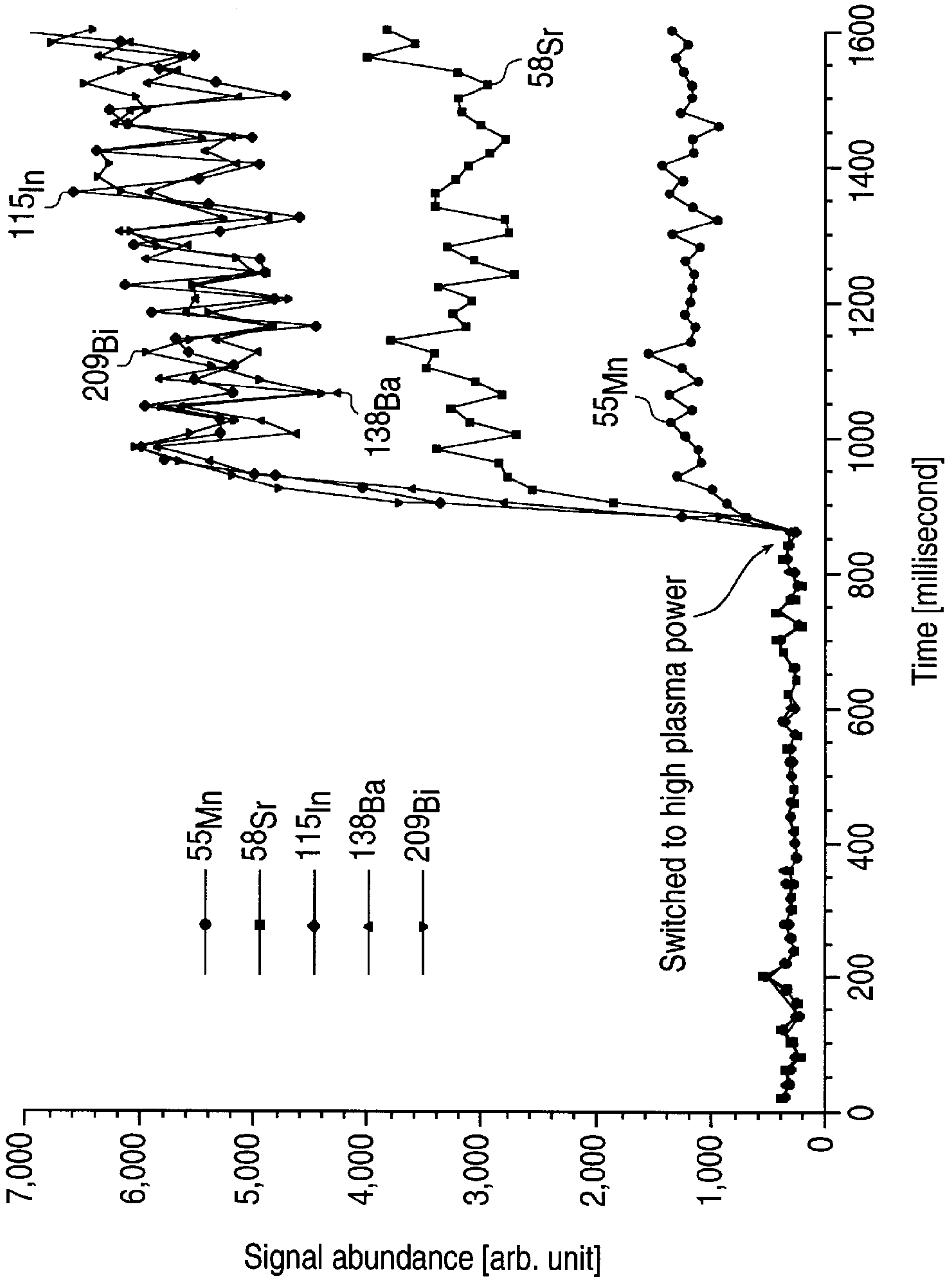
FIG. 6 shows the results of an exemplary run with pulsed plasma power in a ICP-MS analyzing a sample containing 5 elements (manganese, strontium, indium, barium and bismuth).

FIG. 6 shows the results of an exemplary run with pulsed plasma power. In this run, signals of 5 elements (manganese, strontium, indium, barium and bismuth, representing a wide range of ion masses) were collected with a power modulated plasma time-of-flight mass spectrometer. In this example, the ICPG taken from a HP4500PLUS inductively coupled plasma quadrupole mass spectrometer is coupled with a time-of-flight mass spectrometer. During the low power period (about 600 Watts from 0 to 850 milliseconds), no ion signal was observed. When the plasma was switched to high power (about 1300 Watts from approximately 850 milliseconds to 1600 milliseconds), the ion signal of all masses reached a stable level within about 100 milliseconds. The time between data points is 20 milliseconds. In the analysis period, $^{55}Mn$ is less abundant than the others and $^{58}Sr$ is more abundant than $^{55}Mn$. The plot shows that no apparent mass dependence in the rise time of the signals.

Although the preferred embodiment of the present invention has been described and illustrated in detail, it is to be understood that a person skilled in the art can make modifications within the scope of the invention. For example, although the embodiments described in details involve mass spectrometers, one skilled in the art, based on the present disclosure, will be able to couple ICPG with other spectrometers (such as optical emission spectrometers, spectrometers combining MS and optical emission) and control them to operate with pulsed plasma such that during the washout time lower stand-by power level(s) can be used. An example of a commercially available ICP-OES is PLASMA 400 inductively coupled plasma optical emission spectrometer available from Perkin-Elmer Corporation, Norwalk, Conn., USA.

What is claimed is:

1. An analytical apparatus, comprising:

(a) inductively coupled plasma generator (ICPG) for generating a plasma for forming excited atomic, molecular, or ionic species from a sample introduced into the plasma;

(b) spectrometer associated with the ICPG for analyzing the species formed in the ICPG, the spectrometer having an analysis mode wherein one or more of the species are identified according to physical characteristics of the species to provide data on the species formed and having a washout mode wherein the spectrometer flushes out interfering ions, atoms, or molecules therein and provides no significant data on the sample;

(c) cooling means to cool one or more parts of the apparatus; and (d) controller for modulating the ICPG to operate in power cycles, at each cycle the ICPG operates in an analysis period at one or more analysis power levels to generate plasma to form the species from the sample to correspond to the analysis mode of the spectrometer and the ICPG stands-by in a stand-by period at one or more stand-by power levels lower than the one or more analysis power levels to correspond to the washout mode of the spectrometer, the controller is adapted to modulate the ICPG such that the cooling need of the apparatus by the cooling means is reduced.

2. The apparatus according to claim 1 wherein the spectrometer comprises a mass spectrometer or an optical emission spectrometer to identify the species according to physical characteristics of mass-to-charge ratios or optical emission characteristics.

3. The apparatus according to claim 2 wherein the spectrometer is a mass spectrometer.

4. The apparatus according to claim 3 wherein the spectrometer is a time-of-flight mass spectrometer (TOFMS).

5. The apparatus according to claim 1 wherein the controller modulates the ICPG such that the cooling need of the apparatus is minimized.

6. The apparatus according to claim 1 wherein the ICPG is modulated such that the stand-by period is at least 15% of the duration of a cycle.

7. The apparatus according to claim 1 wherein the ICPG is modulated such that it forms ions and excited atoms and molecules from the sample at two or more sequential analysis power levels.

8. The apparatus according to claim 1 wherein the apparatus comprises a waveform generator to modulate the ICPG to stand-by with a cyclical waveform of two or more stand-by power levels during the stand-by period.

9. The apparatus according to claim 1 wherein the apparatus comprises an oscillating means to oscillate the plasma power during the stand-by period at two alternating stand-by power levels: a first power level at about zero power and a second power level higher than zero power but less than half the maximum analysis power level.

10. The apparatus according to claim 1 wherein the ICPG is modulated such that it operates at a high power level and a medium power level for analysis, and stands by at one or more stand-by power levels lower than the medium power level.

11. A method for analyzing a sample, comprising:

(a) providing an inductively coupled plasma generator (ICPG) to form excited atoms or ions from the sample;

(b) modulating the power of the inductively coupled plasma generator between cycles each including an analysis period for exciting or ionizing the sample and a stand-by period, during the analysis period the ICPG operates at one or more analysis power levels to form at least one of ionic, excited atomic or molecular species from the sample, during the stand-by period the ICPG operates at one or more stand-by power levels lower than the one or more analysis power levels, to determine the chemical composition of the sample;

(c) analyzing the species formed by the ICPG by a spectrometer, the spectrometer having an analysis mode wherein the species are identified according to physical characteristics of the species to provide data on the species formed in the ICPG and a washout mode wherein the spectrometer flushes interfering ions, atoms, or molecules and provides no significant data on the species; and (d) coordination the modulation of the ICPG and the analysis by the spectrometer such that the analysis periods of the ICPG correspond to the analysis mode of the species and the stand-by periods of the ICPG correspond to the washout mode of the spectrometer.

12. The method according to claim 11 further comprising one of analyzing the mass-to-charge ratios and optical emission characteristics of the species as the physical characteristics of the species using one of a mass spectrometer (MS) and an optical emission spectrometer (OES).

13. The method according to claim 12 wherein the species are analyzed by a time-of-flight mass spectrometer (TOFMS) based on the mass to charge ratios of the species.

14. The method according to claim 11 further comprising cooling an interface between the ICPG and the spectrometer and the coordination of the ICPG and the spectrometer is done such that cooling need of the interface is reduced.

15. The method according to claim 11 wherein the ICPG is modulated such that the stand-by period is at least 15% of the duration of a cycle.

16. The method according to claim 11 wherein the ICPG is modulated such that it generates ions, excited atoms or molecules to analyze a sample at two or more sequential analysis power levels in a cycle.

17. The method according to claim 11 wherein the ICPG is modulated such that during the stand-by periods it stands-by with a cyclical waveform of two or more stand-by power levels.

18. The method according to claim 11 wherein the ICPG is modulated such that during the stand-by periods the ICP oscillates between two alternating stand-by power levels: a first power level at about zero power and a second power level higher than zero power but less than half the maximum analysis power level.

19. The method according to claim 11 wherein the the ICPG is modulated such that the maximum stand-by power level is less than half the maximum analysis power level.

20. The method according to claim 11 wherein the ICPG is modulated such that in the analysis period the ICPG operates in two or more analysis power levels sequentially to result in difference in molecular excitation or ionization to provide data on the sample being analyzed, the analysis power levels being at least half of the maximum of the analysis power levels.

21. A method of analyzing a sample with an inductively coupled plasma and a mass spectrometer (MS), comprising:

(a) providing an inductively coupled plasma generator (ICPG) to form ions from the samples;

(b) modulating the power of the inductively coupled plasma generator between cycles each including an analysis period for exciting or ionizing a sample and a stand-by period, during the analysis period the ICPG operates at one or more analysis power levels to form ions from the sample, during the stand-by period the ICPG oscillates between two stand-by power levels lower than the one or more analysis power levels, one of the stand-by power levels being about zero power to reduce power consumed by the ICPG and the other stand-by power level being sufficiently high but less than 50% of the maximum analysis power level to enable the ICPG to readily switch to an analysis power level;

(c) analyzing the ions formed by the ICPG with the MS, the MS having an analysis mode wherein ions are separated according to mass-to-charge ratios to provide data on the ions formed in the ICPG and having a washout mode wherein the MS is being flushed to remove interfering ions and atoms and provides no significant data on the sample;

(d) cooling an interface between the ICPG and the MS, through said interface ions pass from the ICPG to the MS; and (e) coordinating the modulation of the ICPG and the analysis by the MS such that the analysis periods of the ICPG correspond to the analysis mode of the MS and the stand-by periods of the ICPG correspond to the washout mode of the MS to reduce the cooling needed.

22. A method for analyzing samples, comprising:

(a) providing an inductively coupled plasma generator (ICPG) to form excited atoms or ions from the samples;

(b) modulation the power of the inductively coupled plasma generator between cycles each including an analysis period for exciting or ionizing a sample and a stand-by period, during the analysis period the ICPG operates at one or more analysis power level to form at least one of ionic, excited atomic or molecular species from the sample, during the stand-by period the ICPG operates at one or more stand-by power levels lower than the one or more analysis power levels;

(c) analyzing the species formed by the ICPG by a spectrometer, the spectrometer having an analysis mode wherein the species are identified according to physical characteristics of the species to provide data on the species formed in the ICPG and a washout mode wherein the spectrometer flushes interfering ions, atoms, or molecules and provides no significant data on the species;

(d) cooling an interface between the ICPG and the MS, through said interface ions pass from the ICPG to the MS; and (e) coordinating the modulation of the ICPG and the analysis by the MS such that the analysis periods of the ICPG correspond to the analysis mode of the MS and the stand-by periods of the ICPG correspond to the washout mode of the MS to reduce the cooling needed.

23. An analytical apparatus, comprising:

(a) inductively coupled plasma generator (ICPG) for generating a plasma for forming excited atomic, molecular, or ionic species from a sample introduced into the plasma;

(b) spectrometer associated with the ICPG for analyzing the species formed in the ICPG, the spectrometer having an analysis mode wherein one or more of the species are identified according to physical characteristics of the species to provide data on the species formed and having a washout mode wherein the spectrometer flushes out interfering ions, atoms, or molecules therein and provides no significant data on the sample; and (c) controller for modulating the ICPG to operate in power cycles, at each cycle the ICPG operates in an analysis period at one or more analysis power levels to generate plasma to form the species from the sample to correspond to the analysis mode of the spectrometer and the ICPG stands-by in a stand-by period at one or more stand-by power levels lower than the one or more analysis power levels to correspond to the washout mode of the spectrometer, the controller is adapted to modulate the ICPG such that the cooling need of the apparatus is reduced.

* * * * *